United States Patent [19]

Guppy et al.

[11] 3,936,603
[45] Feb. 3, 1976

[54] DIGITAL COMMUNICATION SYSTEMS

[75] Inventors: John R. Guppy, Hitchin; Robin D. Roe, Luton, both of England

[73] Assignee: British Aircraft Corporation Limited, London, England

[22] Filed: Sept. 19, 1974

[21] Appl. No.: 507,418

[30] Foreign Application Priority Data
Sept. 21, 1973 United Kingdom............... 44395/73

[52] U.S. Cl............ 178/69.5 R; 178/88; 179/15 A; 235/92 TF; 235/92 CC; 325/322
[51] Int. Cl.².. H04B 1/16; H04L 15/24; G06G 7/00
[58] Field of Search ..................... 179/15 BS, 15 A; 178/69.5 R, 88; 340/167; 328/63; 325/322; 235/92 PB, 92 PE, 92 TF, 92 CC

[56] References Cited
UNITED STATES PATENTS

| | | | |
|---|---|---|---|
| 2,799,727 | 7/1957 | Segerstrom...................... | 179/15 A |
| 3,133,189 | 5/1964 | Bagley et al. ................... | 235/92 TF |
| 3,593,160 | 7/1971 | Moore............................. | 179/15 BS |
| 3,767,902 | 10/1973 | Estes et al. ..................... | 235/92 CC |

*Primary Examiner*—Charles E. Atkinson
*Assistant Examiner*—Errol A. Krass
*Attorney, Agent, or Firm*—Kemon, Palmer & Estabrook

[57] ABSTRACT

A digital phase locked loop is described which includes a first gate through which incoming pulses are passed to subsequent data processing circuits, a second gate through which reference pulses having a predetermined pulse repetition rate equal to the repetition rate of the wanted incoming pulses are fed to a reset input of a counter such that each reference pulse resets the counter to zero, and a clock generator for feeding clock pulses to the counter. The counter is thereby repeatedly stepped through a predetermined cycle, the nominal period of the counter cycle being equal to the nominal period of the reference pulses, and means responsive to the number stored in the counter reaching a first predetermined value then latches both the first and second gates open for a predetermined relatively short period in each counter cycle during which the counter passes through its zero state.

4 Claims, 1 Drawing Figure

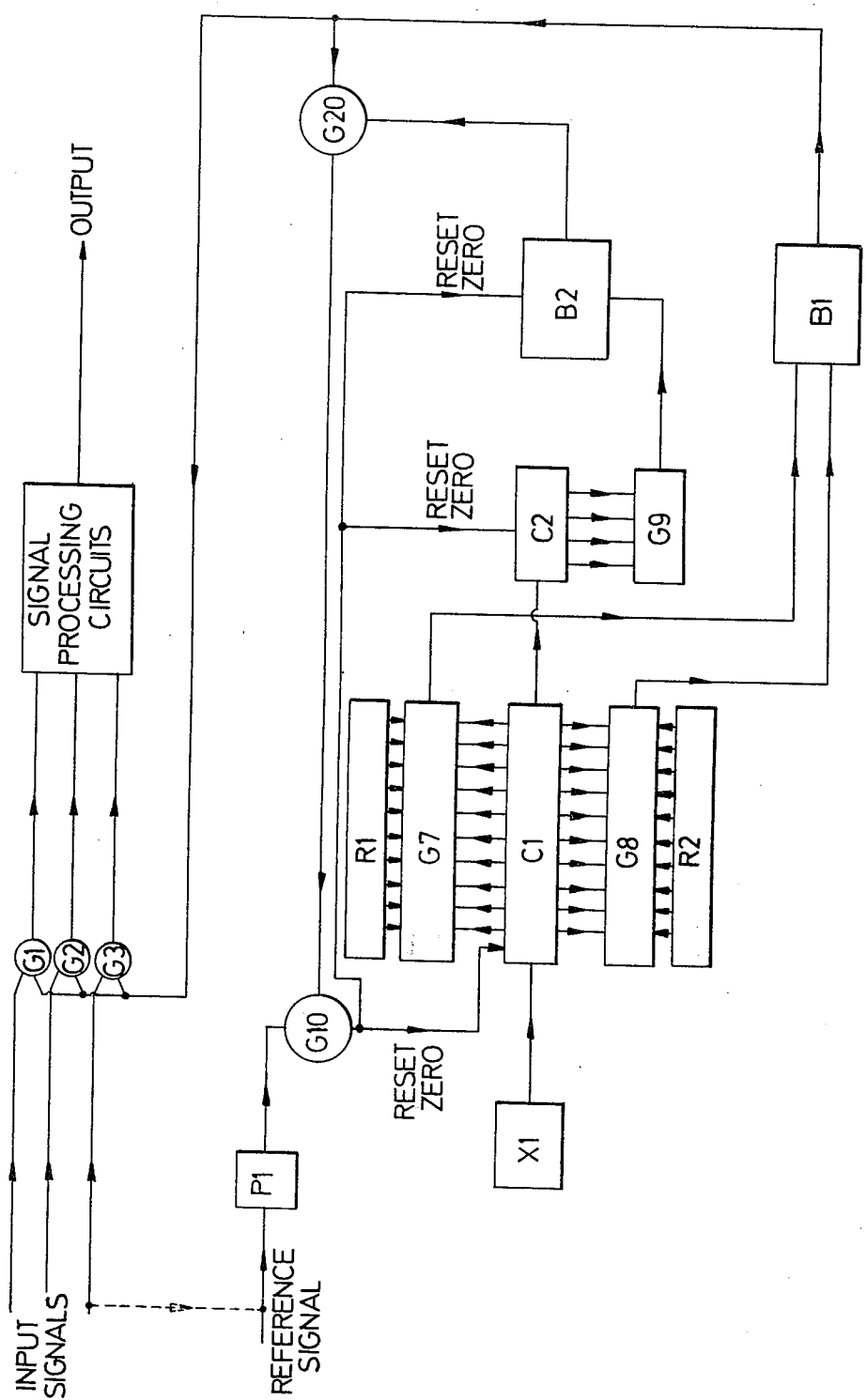

DIGITAL COMMUNICATION SYSTEMS

This invention relates to a digital communication system. A requirement in many receivers used in digital communication systems is that only wanted pulses should be allowed through for further processing. It is not always easy to distinguish between wanted and unwanted pulses.

One solution to this problem when the wanted pulses occur at fixed intervals is to periodically open a gate at the end of each fixed interval, but difficulties immediately arise if there are variations in either the nominal repetition rate of the pulses (because the gate will be closed if the pulses arrive either late or early), or in the frequency with which the gate is opened (because the gate may be closed even if the pulses arrive on time).

In accordance with the present invention a receiver for use in a digital communication system in which wanted incoming pulses occur at fixed intervals, includes a first gate through which the incoming pulses are passed to subsequent data processing circuits, a second gate through which reference pulses having a predetermined pulse repetition rate equal to the repetition rate of the wanted incoming pulses are fed to a reset input of a counter such that each reference pulse resets the counter to zero, a clock generator for continuously feeding clock pulses to the counter such that the counter is repeatedly clocked through a predetermined cycle, the nominal period of the counter cycle being equal to the nominal period of the reference pulses, and means responsive to the number stored in the counter reaching a first predetermined value for latching both the first and second gates open for a predetermined relatively short period in each counter cycle during which the counter passes through zero.

In this manner variations in either the arrival time of the wanted pulses, the frequency of the clock generator, or in the frequency of the reference pulses are accommodated without the possibility of blocking wanted pulses.

In a preferred embodiment of the invention the two gates are unlatched (closed) in response to the counter reaching a second predetermined value, the two values being respectively arranged toward the end of the counter cycle and at the start of a new cycle such that they lie on each side of the zero state.

In certain systems the wanted incoming pulses may be used as the reference pulses. Since the second gate is only open for a short period centred about the expected arrival time of these pulses, it is unlikely that the counter will be reset by pulses other than the wanted pulses. At the same time only the wanted pulses will be gated through for subsequent processing.

In order that the invention may be more clearly understood, one example will now be described with reference to the accompanying drawing in which the sole FIGURE is a block circuit diagram of a digital phase lock loop for use in a receiver in a digital communication system.

In this FIGURE the incoming signals to be gated are passed to signal processing circuits through logic gates G1 to G3. The gates G1 to G3 are only enabled to pass these signals when the bistable circuit B1 is latched in a first predetermined state.

Incoming reference pulses which, as shown by the dotted line may also comprise one of the signals being gated and processed, are fed to the reset input of a binary counter C1 through a pulse shaping circuit P1 and a logic gate G10. The binary counter C1 has 10 binary stages, and each time a pulse is fed to the counter from a crystal oscillator X1 the number in the counter increases by one until it reaches its maximum value of $2^{10} - 1 = 1023$. The next pulse then returns the counter to its zero state. The counter is repeatedly stepped through this cycle in a time of $1024/f_o$ where $f_o$ is the frequency of the oscillator X1. The oscillator frequency is chosen so that this time is equal to the time between the reference pulses fed to the reset input of the counter through gate G10.

When the first reset pulse is received the counter may be in any one of its 1024 states but the reset pulse pulls the counter into phase with the reference pulses and therefore into phase with the pulses being gated and processed. Since the reference pulses may not be exactly at the same frequency as the crystal oscillator due to drift and/or tolerance on the crystals, the gate G10 is opened a little before the counter is full and then closed a little after the counter has passed through zero. This is achieved by a first set of equivalence gates G7 which detect when the number in the counter reaches 1016 (8 steps before the zero state) and a second set of equivalence gates G8 which detect when the number in the counter reaches 16 (16 steps after the zero state). The two sets of equivalence gates compare the binary number in the counter with the binary equivalents of 1016 and 16 respectively stored in the registers R1 and R2 and produce output pulses which trigger the bistable B1 whenever equivalence occurs.

The bistable circuit B1 is thus triggered from its first predetermined state to its second predetermined state each time the count reaches 16 and from its second predetermined state back to its first state each time the count reaches 1016. Thus the bistable remains in its first state (in which gates G1 to G3 are enabled) only for the short period during which the count passes from 1016 to 16. While it is in its first state, bistable B1 enables OR gate G20 so that the gate G10 is also enabled for this short period.

If one of the reference pulses fails to appear, the counter keeps cycling and maintains the period for which the gates G1 to G3 and G10 are open in the same position relative to the phase of the reference pulses as it was when the last reference pulse was received. This position is maintained until the reference pulses reappear. If, however, the reference pulses only reappear after a very long interval, the next pulse to be received may not occur during the period when the gates are latched open and the whole system would therefore breakdown. To overcome this problem a missing pulse counter C2 is included in the phase lock loop.

During normal operation the missing pulse counter C2 receives a pulse from the counter C1 at the end of each cycle, and each time the counter C1 is reset by a reference pulse the counter C2 is also reset so that the counter C2 counts one only. However, if the incoming reference pulses are lost, the count in the missing pulse counter C2 builds up and the number of missing pulses is therefore counted. A further set of equivalence gates G9 compare the count in the missing pulse counter with a predetermined number, and if the number of pulses in the counter exceeds this number, the output from the equivalence detector G9 triggers a bistable B2. Once the bistable B2 has been triggered the gate G20 is enabled and therefore the gate G10 is opened and will remain open until the bistable B2 is returned to its original state. This is achieved only when the next reference pulse eventually appears because this pulse will reset the counter C2 as well as the bistable B2.

It should be understood that references in this specification, and in the accompanying claims, to a digital communication system include a communication system in which the transmitted pulses represent analogue signals, for example by continuous modulation of the pulse amplitude.

We claim:

1. A receiver for use in a digital communication system in which incoming data pulses occur at fixed intervals, the receiver including a data processing circuit, a first gate through which incoming data pulses are passed to said data processing circuit, a counter having a reset input and a clock input, a second gate through which reference pulses having a predetermined pulse repetition rate equal to the repetition rate of the incoming data pulses are fed to said reset input of said counter such that each reference pulse resets the counter to zero, a clock generator for feeding clock pulses to said clock input of said counter such that the counter is repeatedly stepped through a predetermined cycle, the nominal period of the counter cycle being equal to the nominal period of the reference pulses, means responsive to the count stored in the counter reaching a first predetermined value during any given cycle of the counter for latching both said first and said second gates open, and means responsive to the count in the counter reaching a second predetermined value during the next succeeding cycle for releasing the latch whereby the two gates remain open for a predetermined period before and after the expected arrival time of a data pulse.

2. A receiver according to claim 1 further including means responsive to the count stored in the counter reaching a second predetermined value for closing said first and second gates at the end of the said predetermined period.

3. A receiver according to claim 2 in which said latching means includes a bistable circuit, said first and second gates being enabled whenever said bistable circuit is in a first predetermined state, a first equivalence detector for triggering the bistable circuit from a second state to a first state whenever the count in said counter reaches said first predetermined value, and a second equivalence detector for triggering said bistable circuit from a first state to a second state whenever the count stored in said counter reaches said second predetermined value.

4. A receiver according to claim 1 further including a second counter having its clock input connected to receive an output pulse from said first counter at the end of each cycle of said first counter, and having a reset input connected to receive said reference pulses, and comparison means responsive to the count stored in the said second counter reaching a predetermined value for latching the second gate open.

* * * * *